G. W. BLISS.
Domestic Boiler.
No. 100,361.    Patented March 1, 1870.
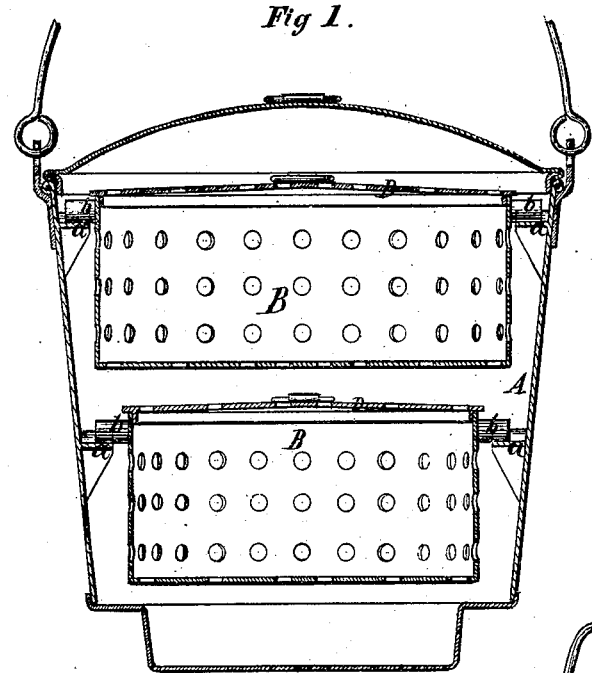
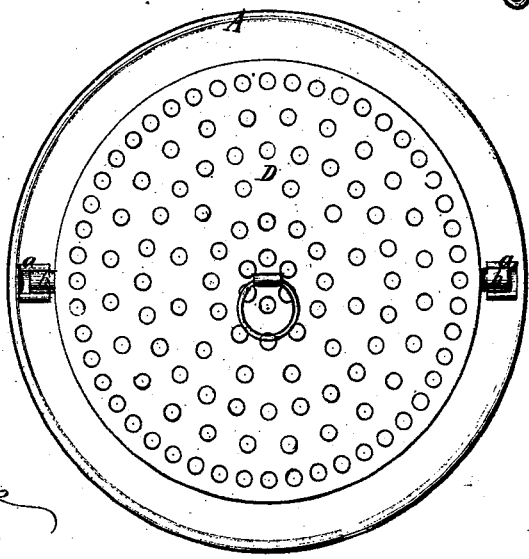
Witnesses.
Fred. Haynes
Inventor.
George W. Bliss

United States Patent Office.

GEORGE W. BLISS, OF BROOKLYN, NEW YORK.

Letters Patent No. 100,361, dated March 1, 1870.

CULINARY BOILER.

The Schedule referred to in these Letters Patent and making part of the same

*To all whom it may concern:*

Be it known that I, GEORGE W. BLISS, of Brooklyn, in the county of Kings, and State of New York, have invented a new and useful Improvement in Cooking-Boilers, of which the following is a full, clear, and exact description, reference being had to the accompanying drawing forming part of this specification—

The object of this invention is to prevent such articles of food as are to be boiled from coming in contact with the bottom or sides of the boiler, and thereby being burned, and also, when several articles of different kinds are to be cooked in the same boiler, to prevent them coming in contact with each other. To this end, It consists in providing a boiler with one or more baskets or perforated boxes of metal, suspended by trunnions in bearings attached to the interior of the sides of the boiler, such baskets or boxes being intended for the reception of the articles which are to be cooked Referring to the accompanying drawing—

Figure 1 is a central vertical section of a cooking-boiler having my invention applied;

Figure 2 is a plan of the same with the cover removed; and

Figure 3 is a perspective view of a handle by which the baskets may be inserted into and removed from the boiler while the water is hot.

Similar letters of reference indicate corresponding parts in all the figures.

A is a boiler, such as is generally used for culinary purposes, but constructed or provided on the interior of its sides with bearings *a a*, for the reception of trunnions *b b* on the baskets or perforated boxes B B.

These baskets or boxes may be made of tin plate or other suitable metal, of cylindrical or other forms, and have the trunnions constructed or provided on the upper portions of their exterior sides; and they are provided with removable covers D D, for the introduction of the articles to be cooked.

C is a bail, provided with hooks to lay hold of the trunnions *b b*, for the purpose of lifting the baskets or boxes from the boiler while hot.

The articles of food to be cooked are placed in the baskets B B, are the cover put on. The baskets or boxes B B and then placed in the boiler, with their trunnions in the bearings *a a*, and during the cooking process the contents of the several baskets or boxes are kept separate from each other, and the contents of each are kept out of contact with the bottom and sides of the boiler A, and thus prevented from being burned.

What I claim, and desire to secure by Letters Patent, is—

The baskets or perforated boxes B B, provided with trunnions and suspended within the boiler A, substantially as and for the purpose herein described.

GEORGE W. BLISS.

Witnesses:
FRED. HAYNES,
HENRY PALMER.